(12) United States Patent
Bauer (10) Patent No.: US 11,204,002 B2
(45) Date of Patent: Dec. 21, 2021

(54) IGNITION DEVICE AND IGNITION METHOD

(71) Applicant: Christian Bauer, Munich (DE)

(72) Inventor: Christian Bauer, Munich (DE)

( * ) Notice: Subject to any disclaimer, the term of this patent is extended or adjusted under 35 U.S.C. 154(b) by 314 days.

(21) Appl. No.: 16/312,960

(22) PCT Filed: Jun. 22, 2017

(86) PCT No.: PCT/EP2017/065471
§ 371 (c)(1),
(2) Date: Dec. 21, 2018

(87) PCT Pub. No.: WO2017/220754
PCT Pub. Date: Dec. 28, 2017

(65) Prior Publication Data
US 2019/0219001 A1   Jul. 18, 2019

(30) Foreign Application Priority Data

Jun. 24, 2016 (DE) .................. 10 2016 111 669.6
Jul. 6, 2016 (DE) .................. 10 2016 112 436.2
Jul. 8, 2016 (DE) .................. 10 2016 112 619.5

(51) Int. Cl.
*F02K 9/95* (2006.01)
*F02K 9/52* (2006.01)

(52) U.S. Cl.
CPC ............... *F02K 9/95* (2013.01); *F02K 9/52* (2013.01); *F05D 2260/601* (2013.01)

(58) Field of Classification Search
CPC ......... F02K 9/52; F02K 9/95; F05D 2260/601
See application file for complete search history.

(56) References Cited

U.S. PATENT DOCUMENTS 3,534,909 A * 10/1970 Rosales ............... F23C 7/008
                                                239/416
3,994,232 A * 11/1976 Rakowsky ............ F42C 15/29
                                                102/205
(Continued)

FOREIGN PATENT DOCUMENTS

CN   101 699 053 A   4/2010
CN   101 852 146 A   10/2010
(Continued)

OTHER PUBLICATIONS

International Search Report issued in PCT/EP2017/065471; dated Oct. 5, 2017.
(Continued)

*Primary Examiner* — Craig Kim
(74) *Attorney, Agent, or Firm* — Studebaker & Brackett PC (57) ABSTRACT

An igniting device for igniting a mixture, in particular for an engine, comprises an energy converting device and a fluid flow injecting device. The energy converting device is configured for converting fluid flow energy of at least one fluid flow into heat, thereby igniting the mixture. The energy converting device comprises an ignition chamber for the at least one fluid flow. The fluid injecting device is configured for injecting a plurality of fluid flows into the ignition chamber. The injection takes place such that a first fluid flow is injected into the ignition chamber with a higher fluid flow velocity than a second fluid flow.

16 Claims, 7 Drawing Sheets

(56) References Cited

U.S. PATENT DOCUMENTS

| | | | | |
|---|---|---|---|---|
| 5,109,669 A * | 5/1992 | Morris | ............... | F02K 9/95 |
| | | | | 102/380 |
| 6,272,845 B2 * | 8/2001 | Kessaev | ............ | F02K 9/95 |
| | | | | 60/212 |
| 6,966,769 B2 * | 11/2005 | Elvander | .......... | F23Q 13/00 |
| | | | | 431/263 |
| 8,966,879 B1 * | 3/2015 | Munson | ............ | F02K 9/95 |
| | | | | 60/200.1 |
| 9,476,399 B1 * | 10/2016 | Munson | ............ | F02P 3/12 |
| 2005/0221245 A1 * | 10/2005 | Elvander | .......... | F23Q 13/00 |
| | | | | 431/278 |

FOREIGN PATENT DOCUMENTS

| | | |
|---|---|---|
| CN | 101 852 147 A | 10/2010 |
| CN | 101 852 148 A | 10/2010 |
| GB | 2 256 677 A | 12/1992 |

OTHER PUBLICATIONS

Ganesh Raman et al.; "The Powered Resonance Tube: From Hartmann's Discovery to Current Active Flow Control Applications"; Progress in Aerospace Sciences; 2009; pp. 97-123; vol. 45.

\* cited by examiner

IGNITION DEVICE AND IGNITION METHOD

CROSS-REFERENCE TO RELATED APPLICATIONS

This application is a National Stage of International Patent Application No. PCT/EP2017/065471, filed Jun. 22, 2017, which claims benefit from DE 10 2016 111.669.6, filed Jun. 24, 2016, DE 10 2016 112 436.2, filed Jul. 6, 2016, and DE 10 2016 112 619.5, filed Jul. 8, 2016, the entire content of each are incorporated herein by reference.

BACKGROUND

Technical Field

The disclosure relates to an ignition device, an engine provided therewith and an ignition method. Furthermore, the disclosure relates to an aircraft and a spacecraft having such an engine.

Background Art

It is known in the prior art that in cavities excited to oscillate by under-expanded supersonic open jets strong thermal effects may be observed. As a driving factor, natural instabilities within the open jet—barrel shocks—are identified, which induce shockwaves within the resonator. Based on this there are numerous ideas which make use of these kind of effects for igniting gas mixtures, mostly applied in rocket engines.

A good compilation about essential developments of engine ignition devices is given in a peer reviewed article by RAMAN, G.; SRINIVASAN, K. "The powered resonance tube: From Hartmann's discovery to current active flow control applications." from Progress in Aerospace Sciences, n. 45, 2009, which is incorporated into this disclosure by reference. U.S. Pat. No. 6,966,769 B2, for example, discloses a gas dynamic resonance igniter having a corpus with a first inlet which has a supersonic nozzle. An outlet of the corpus includes an opening of pre-defined size as to obtain a desired pressure within the corpus. An aperture within the corpus opposite the first inlet allows for access to a ceramic resonator cavity. A ceramic emission disc is engaged at a second end of the resonator cavity. An end cap includes an intermediate space, which is adapted for accommodating a high temperature oxygen flow from the resonator cavity through the emission disc. A suction opening is connected to the intermediate space for the high temperature oxygen, which flows into a mixing chamber which includes a pilot fuel for igniting an ignition flame.

CN 101 852 146 A discloses a hydrogen oxygen motorhead for rocket motors. The motor is ignited using a resonance heating effect, which is generated when motor fuel is jetted into a resonance tube. A pneumatic resonance ignition technology having a simple configuration and high reliability is provided. The ignitor is "organically" integrated into the small motorhead, so that the resonance ignitor is configured smaller.

U.S. Pat. No. 3,994,232 A discloses an air-operated ignitor for time-critical applications. CN 101 852 147 A and CN 101 699 053 A disclose a gas dynamic resonance ignitor for rocket motors. The mixing beaker of the resonance ignitor is arranged between the injection nozzle and the ignition chamber and provided with two rows of holes. Hydrogen and oxygen flow from the ignitor nozzle through the mixing beaker into the ignition chamber.

CN 101 852 148 A discloses a resonance ignitor for oxygen/kerosene combustion. U.S. Pat. No. 8,966,879 B1 discloses an acoustic resonance ignitor having an injection nozzle which generates a sonic or an under-expanded supersonic fluid flow.

SUMMARY

The prior art constructions have in common that they use convergent nozzles, so as to generate an under-expanded supersonic open jet. Recent studies, however, show that also strong shear layers are able to excite oscillations within resonator cavities, whereby also strong thermal effects may be reproduced without having the typical strong dependence on boundary conditions. These new findings are introduced into the ideas which are presented here, so as to in particular improve robustness of resonance ignitors.

Accordingly, the disclosure provides improved measures which allow in particular smaller ignition delays and more reliable ignition of mixtures, wherein preferably the robustness of ignitors is increased as a whole.

The disclosure provides an ignition device, in particular an engine ignition device, more in particular a rocket engine ignition device, for igniting a mixture, in particular a mixture for an engine, such as a rocket engine, the ignition device comprising an energy converting device configured for converting fluid flow energy of at least one fluid flow into heat, so as to ignite the mixture, and an ignition chamber, in particular an injection chamber, for the at least one fluid flow, the ignition device further comprising a fluid flow injecting device configured for injecting a plurality of fluid flows into the ignition chamber, in particular the injection chamber, such that a fluid flow is injected into the ignition chamber, in particular the injection chamber, having a higher fluid flow velocity than a second fluid flow.

It is preferred that the fluid flow injecting device is configured such that the first fluid flow is injected with a first fluid flow velocity being at least sonic, preferably supersonic. It is preferred that the fluid flow injecting device is configured such that the first fluid flow in injected with a second fluid flow velocity which is at best sonic, in particular about sonic and/or subsonic.

It is preferred that the fluid flow injecting device is configured such that the second fluid flow is injected with a second fluid flow velocity which is at most sonic, in particular about sonic and/or subsonic. It is preferred that the fluid flow injecting device is configured such that the second fluid flow is injected with a first fluid flow velocity which is at least sonic, preferably supersonic.

It is preferred that the fluid flow injecting device is configured such that the first fluid flow and the second fluid flow are coaxially injected relative to each other. It is preferred that the fluid flow is at least partially, preferably completely, surrounds the second fluid flow in the circumferential direction thereof.

It is preferred that the fluid flow injecting device comprises at least one injection nozzle having an injection nozzle cross-section which decreases in direction of flow down to a minimal cross-section, in particular in a continuous manner, and subsequently increases up to a discharge cross-section, in particular in a continuous manner. It is preferred that the fluid injecting device comprises at least one injection nozzle having an injection nozzle cross-section which decreases in the direction of the fluid flow down to a minimal discharge cross-section, in particular in a continuous manner.

It is preferred that a first injection nozzle has a circular cross-sectional shape. It is preferred that a second injection nozzle has a ring-shaped, in particular a circular ring-shaped, cross-sectional shape.

It is preferred that the energy converting device is based apart from the fluid injecting device in an axial direction. It is preferred that the energy converting device has a central axis, which coincides with the central axis of the fluid injecting device. It is preferred that the energy converting device includes a pressure oscillation generating device for generating pressure oscillations from the at least one fluid flow.

It is preferred that the pressure oscillation generating device is arranged within the injection chamber so that the pressure oscillation generating device is impinged by the at least one fluid flow. It is preferred that the pressure oscillation generating device comprises a pressure oscillating generating cavity with a pressure oscillating generating opening, wherein the pressure oscillation generating opening is facing the fluid injecting device in such a way that the pressure oscillation generating cavity impinged by the at least one fluid flow.

It is preferred that the pressure oscillation generating cavity is configured to focus pressure oscillations towards an end, which is distant from the pressure oscillation generating opening. It is preferred that the pressure oscillation generating cavity is configured substantially conical.

It is preferred that the energy converting device comprises a heat transport reducing device configured for reducing transport of heat generated by the energy converting device, in particular the pressure oscillation generating device, away from the energy converting device, in particular away from the pressure oscillation generating device. It is preferred that the heat transport reducing device comprises a heat transport reducing means, which at least partially, in particular completely, surrounds the energy converting device, in particular the pressure oscillation generating device, in a least a circumferential direction thereof.

It is preferred that the heat transport reducing device has a heat transport suppressing portion, which is provided between the heat transport reducing means and the energy converting device, in particular the pressure oscillation generating device.

It is preferred that the heat transport reducing device is configured such that a convection of heat away from the energy converting device, in particular away from the pressure oscillation generating device, is suppressed or reduced.

Preferably the ignition device comprises an outlet device by which the at least one fluid flow is let out.

The disclosure provides an engine, in particular a rocket engine, for an aircraft, in particular an airplane, or a space craft, in particular a satellite, the engine having a combustion chamber and a preferred engine ignition device, wherein the engine ignition device is connected to the combustion chamber in such a manner that a mixture present in the combustion chamber is ignited by the engine ignition device.

The disclosure further provides an aircraft, in particular an airplane, or a spacecraft, in particular a satellite, having a preferred engine.

The disclosure further provides an ignition method for igniting a mixture present in an ignition chamber of an engine by injecting a plurality of fluid flows into an ignition chamber, in particular an injection chamber, wherein a first fluid flow is injected with a higher fluid flow velocity than a second fluid flow.

It is preferred that the first fluid flow is injected with a first fluid flow velocity which is at least sonic, preferably supersonic. It is preferred that the second fluid flow is injected with a second fluid flow velocity, which is at most sonic, in particular about sonic, and/or subsonic.

It is preferred that the first fluid flow and the second fluid flow are coaxially injected relative to each other. It is preferred that the first fluid flow is injected in a manner at least partially, preferably completely, surrounding the second fluid flow in a circumferential direction thereof.

It is preferred that a pressure oscillation generating device arranged within the injection chamber is impinged by the at least one fluid flow. It is preferred that a pressure oscillating generating cavity is impinged by the at least on fluid flow through the pressure oscillation generating opening.

It is preferred that pressure oscillations are focused towards an end, which is distant from the pressure oscillation generating opening. It is preferred that the heat generated by the energy converting device is concentrated on a closed end thereof. It is preferred that a convection of heat away from the energy converting device, in particular away from the pressure oscillating generating device, is reduced or prevented.

With the ignition device presented here, which is also designated as a gas dynamic resonance ignitor, effects of fluid mechanics are used in order to passively ignite a (gas) mixture without moving parts and/or external energy supply. One particular requirement is that one component is present, which has sufficient pressure and is compressible.

The media are released by a fluid injecting device, e.g. via a special nozzle, and guided into a cavity/resonator and thereby are excited towards strong oscillations. Irreversible effects (e.g. friction, shockwaves) release energy, which is stored within the fluid, as heat by which usually a continuous temperature increase within the resonator may be achieved up to self-ignition of the mixture. Effectively, fluid energy is converted by an energy converting device into heat.

The ignitor presented herein is based on a nozzle concept which compared to known resonance ignitors provides several advantages. Due to the simple and robust structure a gas dynamic ignitor is in particular interesting for satellite propulsion which, as a rule of thumb, should function maintenance-free and reliable for more than 10 years. Yet, most other technical combustion processes, which have fluids with sufficient pressure such as aircraft, may profit.

The ignitor according to the disclosure comprises a coaxial injector, a resonator, a housing and a convergent outlet aperture. Spacers serve to set the distance between nozzle and resonator. The housing may at the same time serve as an interface to a combustion chamber which is to be ignited downstream.

The diameter of the outlet aperture is preferably chosen such that within the ignitor a desired pressure $p_{cold}$ is set, so that the aperture has critical flow through it, i.e. sonic. The impact of pressure fluctuations on the combustion chamber side or outlet side, respectively, on the ignitor may thus may be reduced or even prevented.

The outlet, preferably configured as annular gap, of the coaxial injector may be adapted to the pressure $p_{cold}$ as convergent-divergent nozzle in contrast to other constructions, so as to accelerate the supplied oxidant mass flow to supersonic speeds. By adapting to the downstream pressure the typical barrel shocks may be avoided. In addition, there is no need any more for a strict sequential feeding of both the fuels; instead both fluids may be fed simultaneously. The fuel injector, which is in particular arranged at the center, is preferably configured in a convergent manner. The injection diameters are preferably chosen such that the necessary fuel mass flow is released at critical flow with pressure $p_{cold}$.

By releasing the media with different Mach numbers, strong shear effects, which may be inherently unstable, can be generated between both media. Thereby a vortex detachment may be caused. The vortices impinge downstream on the resonator, which is an example for a pressure oscillation generating device. Within the resonator the vortices generate strong shocks or pressure oscillations within the resonator cavity, which cause the enclosed gas to be repeatedly compressed and released. Due to irreversible effects, the fluid in proximity to the closed end of the resonator is heated. In order to achieve the fastest heating possible, heat loss into the surroundings is minimized, e.g. by a suitable resonator design. The conical form of the cavity may focus the shocks towards the closed end, so as to increase heat production. At the same time the resonator may be built with thin walls. Preferably, the resonator is protected at the heated end by a jacket from convective heat loss to the surroundings.

After a short heating phase usually the pre-mixed fluid within the resonator ignites. The combustion may spread into the whole portion downstream of the injector. The resulting hot gas leaves the ignitor through the outlet aperture and is thus able to ignite the ignition chamber of an engine downstream. Since there are no requirements regarding the downstream ignition chamber, the ignitor has lots of applications provided it has sufficient thermal power.

The mixing ratio O/F (oxidant/fuel) within the ignitor is preferably chosen such that the combustion temperature remains compatible with the materials the engine ignition device is made of. Oxidant can be for instance oxygen, whereas fuel is methane. With a suitable choice of nozzle diameter almost any combination of fuels may be used with the engine ignitor, and ignited therewith.

In order to implement the complex structures of the engine ignition device, as a method of manufacture, micro selective laser melting may be used, for example. This allows for a light and integral construction of the components.

The configuration of the engine ignition device is influenced, among others, by thermal power, fuel combination, mixing ratio and ignitor pressure. The fuel combination and the necessary thermal power are usually pre-determined by the whole system. Within an ignitor for a methane oxygen rocket engine the same combination is also used for the ignitor. The mixing ratio on the other hand may be chosen comparably freely. However, different boundary conditions should be considered. Presently a preferred mixing ratio (O/F) of 30 was chosen.

The mixture is within the ignitable range, close to the lean ignition limit. In this range, the ideal adiabatic flame temperatures are around 1600 K and only change by a small amount with the mixing ratio. A local change of the missing ratio thus only affects the combustion temperature in a small way so that local overheating may be prevented. Although these temperatures within the ideal range of achievable temperatures may exceed the working temperatures of conventional high temperature materials, the real temperatures are, for the most part, significantly lower. This allows, for example, corrosion resistant cobalt-, chrome- or nickel-based alloys as materials.

Operation of the ignitor under excess air conditions is preferred, since rocket engines are always operated fuel rich; however, it is not necessary. An engine ignition device, which for instance is operated with excess oxygen, may not only provide thermal power for the ignition process, but can also generate hot oxygen radicals, which will readily react with the fuel rich main flow. As a result, the ignition process may be significantly simplified and/or accelerated. This is in particular advantageous for time critical applications.

Additionally, using oxygen as a resonance gas allows for higher resonance temperatures compared to methane. It is known, that the heating using air as resonance gas is about 200 K higher compared to methane. Since air, nitrogen and oxygen show almost identical resonance properties, the ignition behavior of the engine ignition device during operation with air is usually transferable to the expected heating during operation with oxygen.

If, however, a combination of hydrogen/oxygen is to be used, fuel rich operation of the engine ignition is preferred; among others since hydrogen may have better resonance properties and thus a better efficiency compared to oxygen.

The (engine) ignitor pressure of the (engine) ignition device in the "cold" states, i.e. with inflowing media (oxidant/fuel) before the actual ignition, preferably exceeds the critical pressure ratio of about two between engine ignitor pressure and ambient pressure. Thereby, a Mach number of one may be achieved at the outlet. The ignitor may thus be convectively decoupled from the surroundings. It should be noted that an increase of ignitor pressure is accompanied with higher inflow pressure. For applications with spacecraft, for example an upper stage or a satellite ignitor, this is non-critical due to expansion into the vacuum.

Starting from the desired fuel combination, the desired mixing ratio and the desired thermal power, the necessary fuel mass flows may be dimensioned. Using the required engine ignitor pressure and taking into account the assumption of Ma=1, the outlet cross-section may be calculated.

A shear layer may for instance be generated, by having an axial needle blocking part of a convergent-divergent nozzle. Thereby a recirculation area behind the needle is provided.

In order to establish a strong shear layer, it is suggested here, to inject a fluid flow, preferably the oxidant, with substantial higher velocity than the fuel. The slower fluid is arranged in the center and surrounded by the outer fluid flow.

BRIEF DESCRIPTION OF THE DRAWINGS

Embodiments of the ignition device are described with reference to the accompanying drawings.

DETAILED DESCRIPTION

Initially, reference is made to FIG. 1 through FIG. 5, which depict an embodiment of an aircraft 10 having an engine 11. The engine 11 is substantially configured in a cylindrical manner and extends in an axial direction and includes an inlet 12 which has a fan 13 arranged therein. The engine 11 further comprises a compressor 14 arranged downstream of the fan 13. Further downstream from the compressor 14, a combustion chamber 15 is provided. A mixture 16 is injected into the combustion chamber 15, the mixture 16 including an oxidant (e. g. air-oxygen) and a fuel (e. g. kerosene). Subsequently, downstream a turbine 17 is provided, which may drive the fan 13 and the compressor 14. Following the turbine 17, a thruster 18 is provided which expels jet wash.

Figure 1:
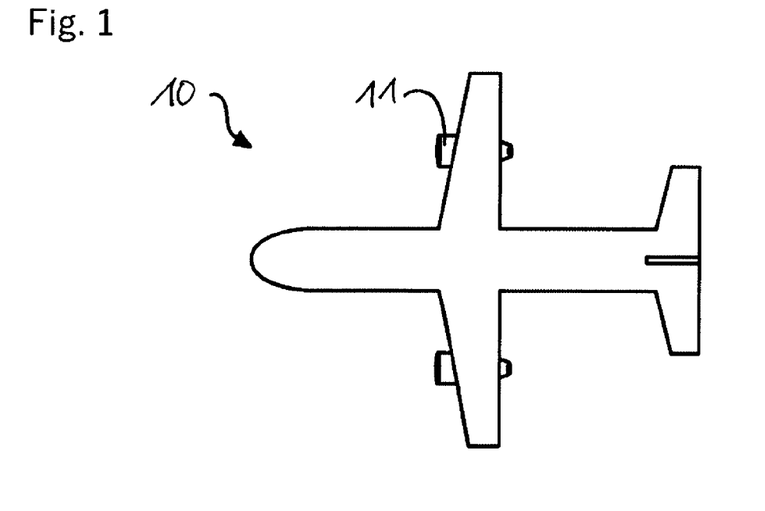
FIG. 1 depicts an embodiment of an aircraft.
Figure 2:
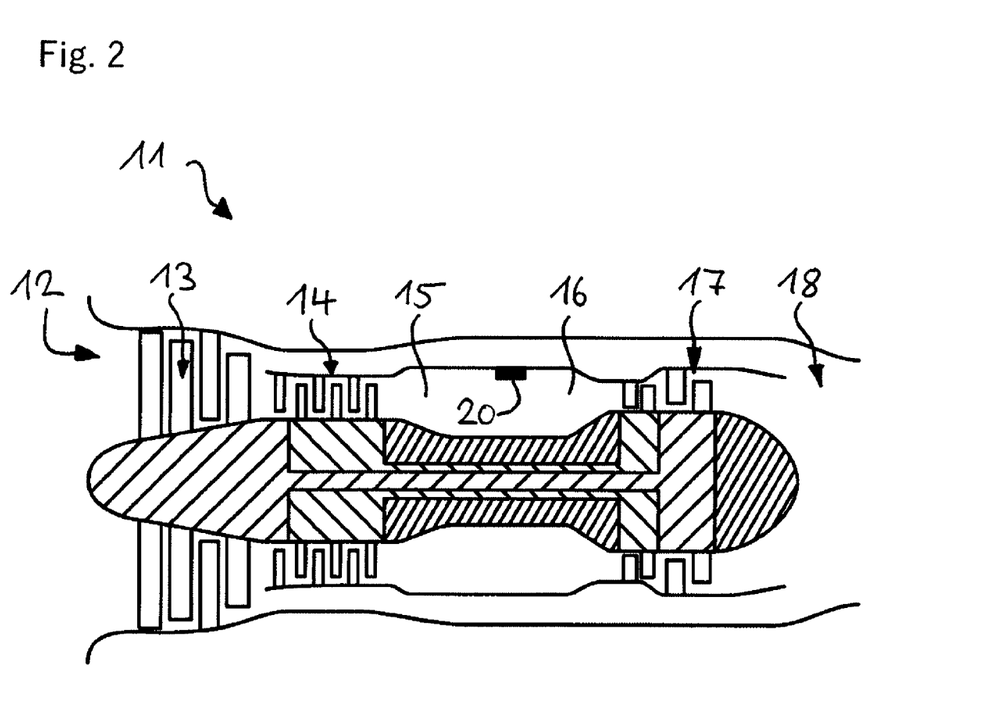
FIG. 2 depicts a cross-section through an embodiment of an engine.
Figure 3:
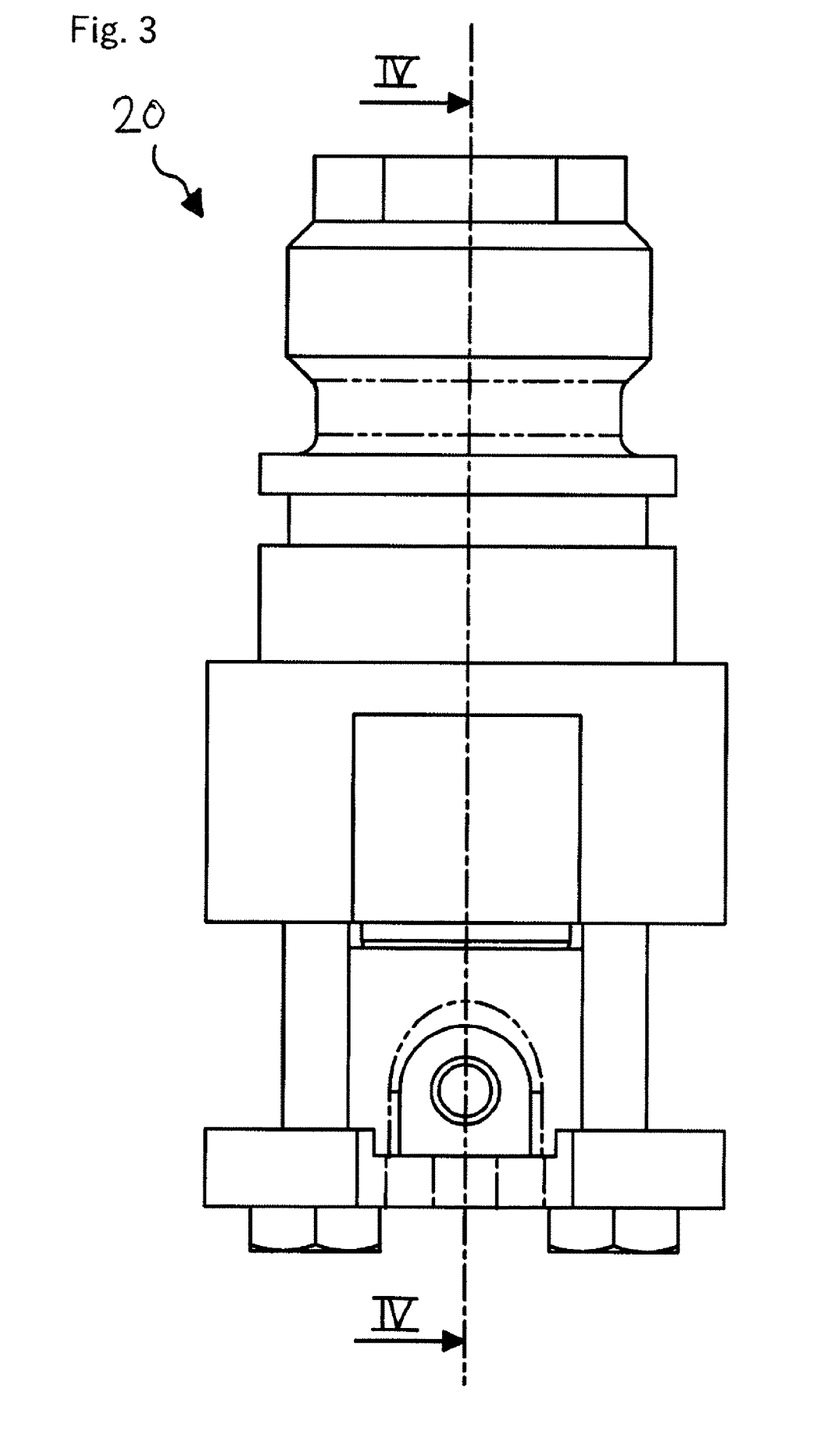
FIG. 3 depicts an embodiment of an ignition device.

The engine 11 comprises an embodiment of an engine ignition device 20. The engine ignition device 20 is connected to the combustion chamber 15 such that the mixture 16 may be ignited by means of the engine ignition device 20. The engine ignition device 20 is made of a chromium-cobalt alloy or nickel-based alloy, e. g. Inconel®. The engine ignition device 20 is substantially configured in a rotational symmetrical manner and extends in an axial direction. The engine ignition device 20 comprises a housing 21.

A fluid flow injecting device 22 is attached to the housing 21. The fluid flow injecting device 22 has an intake portion 30, at which a plurality of fluid flows may be taken in and a discharge portion 31. The discharge portion 31 is attached to the housing 21 such that the plurality of fluid flows is discharged within the housing 21.

The intake portion 30 includes in particular a first fluid supply connector 32, e. g. as outer fluid supply connector 32, and/or a second fluid supply connector 33, e. g. as an inner fluid supply connector 33. Oxidant can be fed through the outer fluid supply connector 32, while fuel may be fed through the inner fluid supply connector 33.

The discharge portion 31 may include a first injection nozzle 36, e. g. as outer injection nozzle 36, and/or a second injection nozzle 37, e. g. as inner injection nozzle 37. The outer injection nozzle is fluidly connected via an outer fluid supply line 34 to the other fluid supply connector 32. Likewise, the inner injection nozzle 37 may be fluidly connected via an inner fluid supply line 35 to the inner fluid supply connector 33. Thus, a first fluid flow 38 e. g. an outer fluid flow 38, and/or a second fluid flow 39, e. g. an inner fluid flow 39, may flow from the intake portion 30 to the discharge portion 31 and be discharged at the discharge portion 31.

Figure 5:
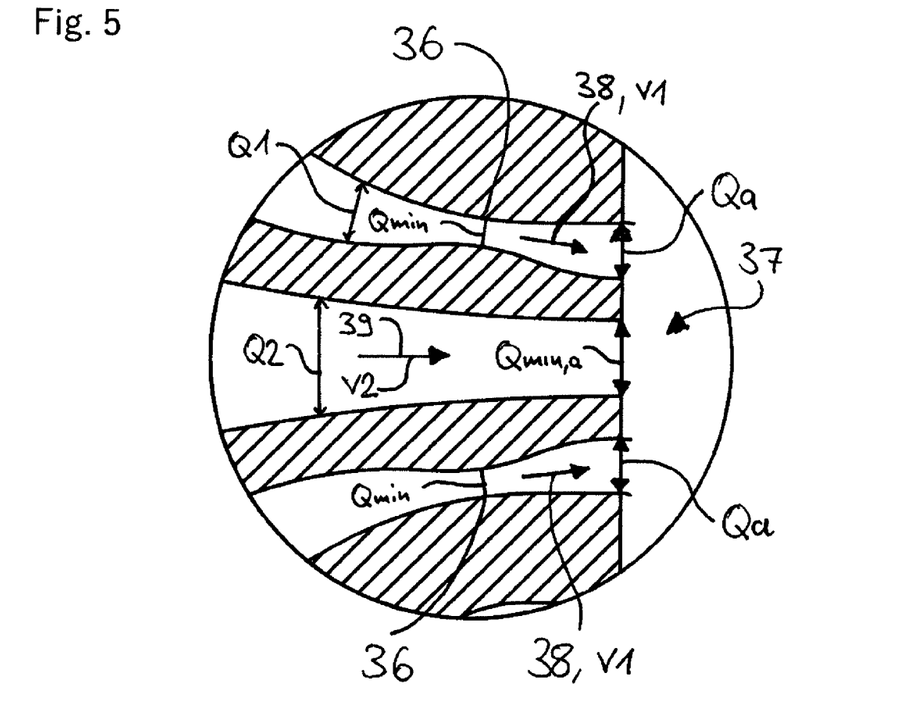
FIG. 5 depicts a detailed view of area E.
Figure 6:
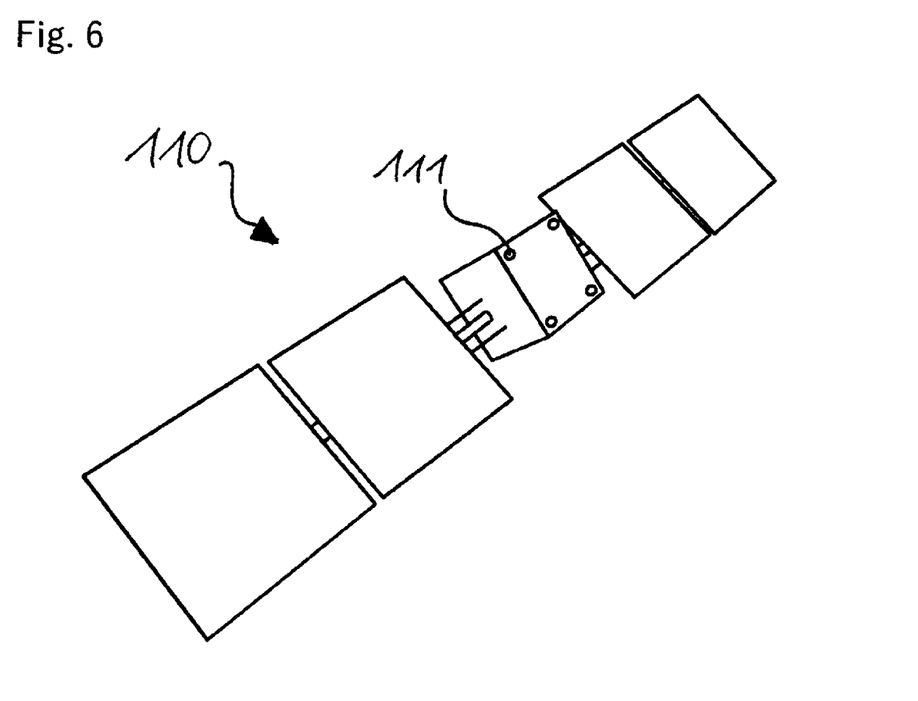
FIG. 6 depicts an embodiment of a spacecraft.

A detailed view of discharge portion 31 is depicted in FIG. 5 particularly. The outer injection nozzle 36 is rotationally symmetric, in particular substantially circular ring-shaped. The outer injection nozzle 36 has an outer injection nozzle cross-section Q1. The outer injection nozzle cross-section Q1 initially decreases in direction of fluid flow of the outer fluid flow 38 down to a minimum cross-section Qmin. At the minimal cross-section Qmin the outer fluid flow velocity v1 achieves the speed of sound and the minimal cross-section Qmin has critical flow through. Subsequently the outer injection nozzle cross-section Q1 increases up to a discharge cross-section Qa. Thus, the outer fluid flow velocity v1 is increased to supersonic speeds.

The inner injection nozzle 37 is rotationally symmetric, in particular essentially circular shaped. The inner injection nozzle 37 has an inner injection nozzle cross-section Q2. The inner injection nozzle cross-section Q2 decreases in direction of the fluid flow of inner fluid flow 39 down to a minimal discharge crosssection Qmin, A. At the minimal discharge cross-section Qmin, are the inner fluid flow velocity v2 achieves at the most sonic speeds. The outer fluid flow 38 thus has a significantly higher fluid flow velocity than the inner fluid flow 39; hence v1>v2. It should be noted that also the opposite configuration may be useful.

Figure 4:
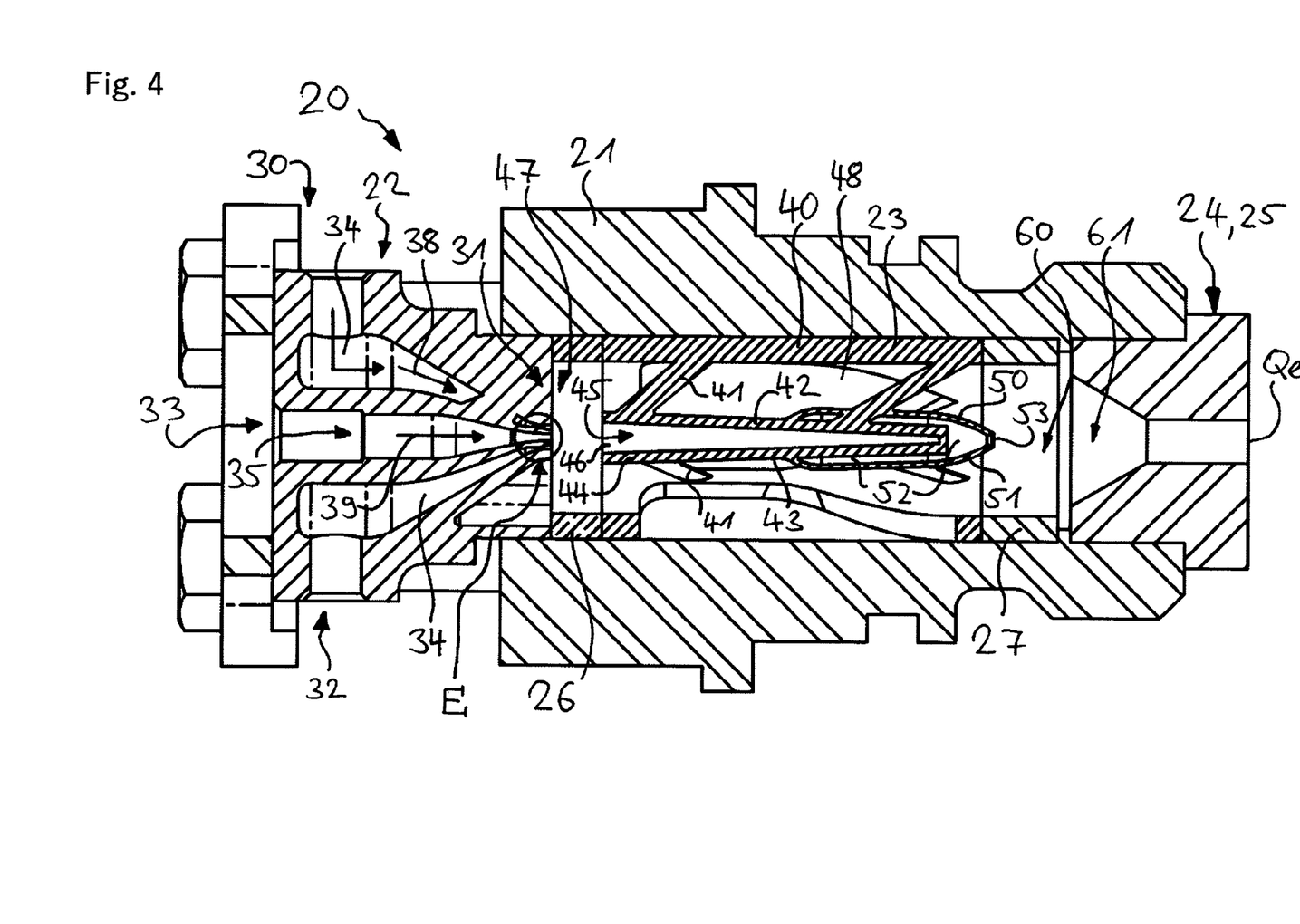
FIG. 4 depicts a cross-section along line IV-IV from FIG. 3.

In particular reference is made to FIG. 4. The engine ignition device 20 further includes an energy converting device 23. The energy converting device 23 is configured to convert fluid flow energy of the outer fluid flow 38 and the inner fluid flow 39 into heat. The energy converting device 23 is rotationally symmetric, in particular essentially cylindrically shaped and may be spaced apart from the fluid injecting device 22 by means of a fluid injecting side spacer 26.

The energy converting device 23 includes a pressure oscillation generating device 42 and an injection chamber 47. The pressure oscillation generating device 46 abuts on the injection chamber 47. The energy converting device 23 may comprise a substantially cylindrical support sleeve 40, so as to support the pressure oscillation generating device 42 on the housing 21. The pressure oscillating supporting device 42 is in particular supported by a plurality of supporting struts 41 on the supporting sleeve 40. The pressure oscillation generating device 42 is arranged relative to the fluid injecting device 22 such that the pressure oscillation generating device 42 may be impinged by the outer fluid flow 38 and/or the inner fluid flow 39. Thus, the injection chamber 47 comprises the space in axial direction between the fluid injecting device 22 and the pressure oscillation generating device 42.

The pressure oscillation generating device 42 has a tubular portion 43, which defines a pressure oscillation generating cavity 45. The pressure oscillating generating cavity 45 is separated from a jacket chamber 48, e. g. by means of tubular portion 43. The jacket chamber 48 adjoins the injection chamber 47 and in particular surrounds the pressure oscillation generating cavity 45. The jacket chamber 48 is confined in radial direction outward by the supporting sleeve 40, while the plurality of supporting struts 41 passes through the jacket chamber 48.

The tubular portion 43 is preferably configured as a tubular cone portion 44, so as to focus the pressure oscillations generated towards the closed end of the pressure oscillation generating device 42. The tubular portion 43 is in particular open towards the fluid injecting device 22. Consequently, the pressure oscillation generating device comprises a pressure oscillation generating opening 43. The pressure oscillation generating opening 46 adjoins the injection chamber 47 and not the jacket chamber 48, however.

The energy converting device 23 may further comprise a heat transport reducing device 50. The heat transport reducing device 50 is provided at a closed end of the pressure oscillation generating device 42 so as to reduce the transport of heat. Heat transport reducing device 50 comprises a heat transport reducing means 51, which is substantially cylindrically shaped corresponding to the outer contour of the pressure oscillation generating device 42 with a streamline form as sort of cap.

The heat transport reducing device 50 further has a heat transport suppressing portion 52, which is provided between the pressure oscillation reducing device 42 and the heat transport reducing means 51. The heat transport suppression portion 52 is dimensioned in such a way that heat transport, in particular heat transport by means of convection, is significantly hindered or even impossible.

Furthermore, the heat transport reducing device 50 comprises a manufacturing opening 53. The manufacturing opening 53 is provided at the outlet side and of the heat transport reducing device 50 and serves to remove superfluous material for manufacture from the heat transport suppressing portion 52. During operation the heat generated in the mixture 16 is confined in the pressure oscillation generating device 42, in particular the pressure oscillation generating cavity 45, by means of the heat transport reducing means 51.

The engine ignition device 20 further comprises an outlet device 24, so as to let out the mixture 16 formed by the outer fluid flow 38 and the inner fluid flow 39 into the surroundings, e. g. the combustion chamber 15. The outlet device 24 may be configured as a pressure defining device 25, which defines the engine ignitor pressure. The outlet device 24 comprises a tapered ejection nozzle 61, which abuts downstream on an ignition chamber 60. The ignition chamber 60 comprises the injection chamber 47, the jacket chamber 48 and the pressure oscillation generating cavity 45. The ejection nozzle 61 is tapered down to an ejection cross-section Qe, at which the mixture 16 flowing out preferably reaches the speed of sound.

The ignition process is now described. The oxidant and/or the fuel are fed via the intake portion 30 into the engine ignition device 20. The outer fluid flow 38 and the inner fluid flow 39 flow through the outer injection nozzle 36 and the inner injection nozzle 37 into the injection chamber 47. The outer fluid flow 38 is injected with the outer fluid flow velocity v1, which is higher than the inner fluid flow velocity v2. A mixture 16 is obtained whose flow is divided between the pressure oscillation generating device 42 and the jacket chamber 48. The impingement on the pressure oscillation generating device 42 generates pressure oscillations, which are focused towards the closed end. By means of inner friction, interaction with components of the engine ignition device 20 and further irreversible fluid mechanical effects, heat is generated mainly at the closed end of the pressure oscillation generating device 42. The heat is concentrated by the heat transport reducing device 50 for ignition, as heat loss is reduced by the heat transport reducing means 51 and/or the convection within the heat transport suppressing portion 52 is suppressed or at least reduced. Thereby the temperature within the ignition chamber 60 increases in particular within the pressure oscillation generating cavity, 45 so much so that the mixture 16 within the ignition chamber 60 is ignited beginning at the closed end of the pressure oscillation generating device 42. The combustion spreads from there into the hole pressure oscillation generating cavity 42 and progresses further via the injection chamber 47 and the jacket chamber 48 towards the ejection nozzle 61. The ignited mixture 16 flows via the ejection nozzle 61 at the speed of sound into the combustion chamber 15, so that the mixture 16, which is present there, is also ignited. The mixtures need not be identical.

Subsequently another embodiment of an engine ignition device 20 is described in so far as it is different from the embodiments described so far.

Reference is made to FIG. 6 through FIG. 9, which depict an embodiment of a spacecraft, e. g. a satellite 110, having a rocket engine 111. The rocket engine 111 is operated, for example, with oxygen as oxidant and methane as fuel and comprises an embodiment of an engine ignition device 120. The engine ignition device 120 is connected to the combustion chamber of the rocket engine 111.

Figure 7:
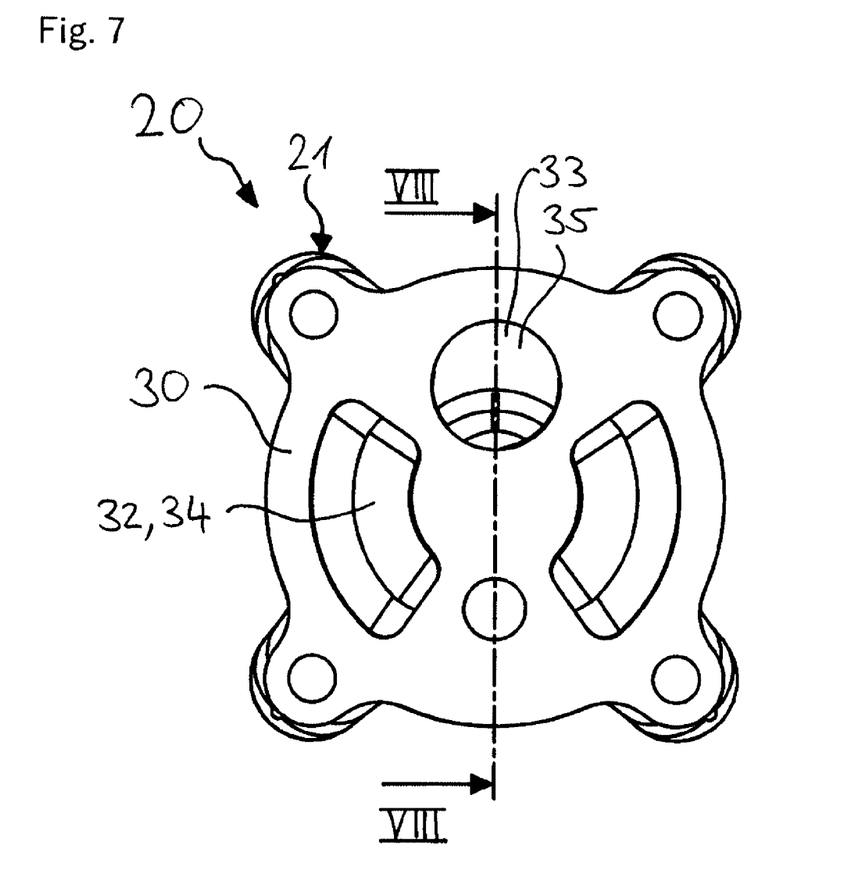
FIG. 7 depicts an embodiment of ignition device.
Figure 8:
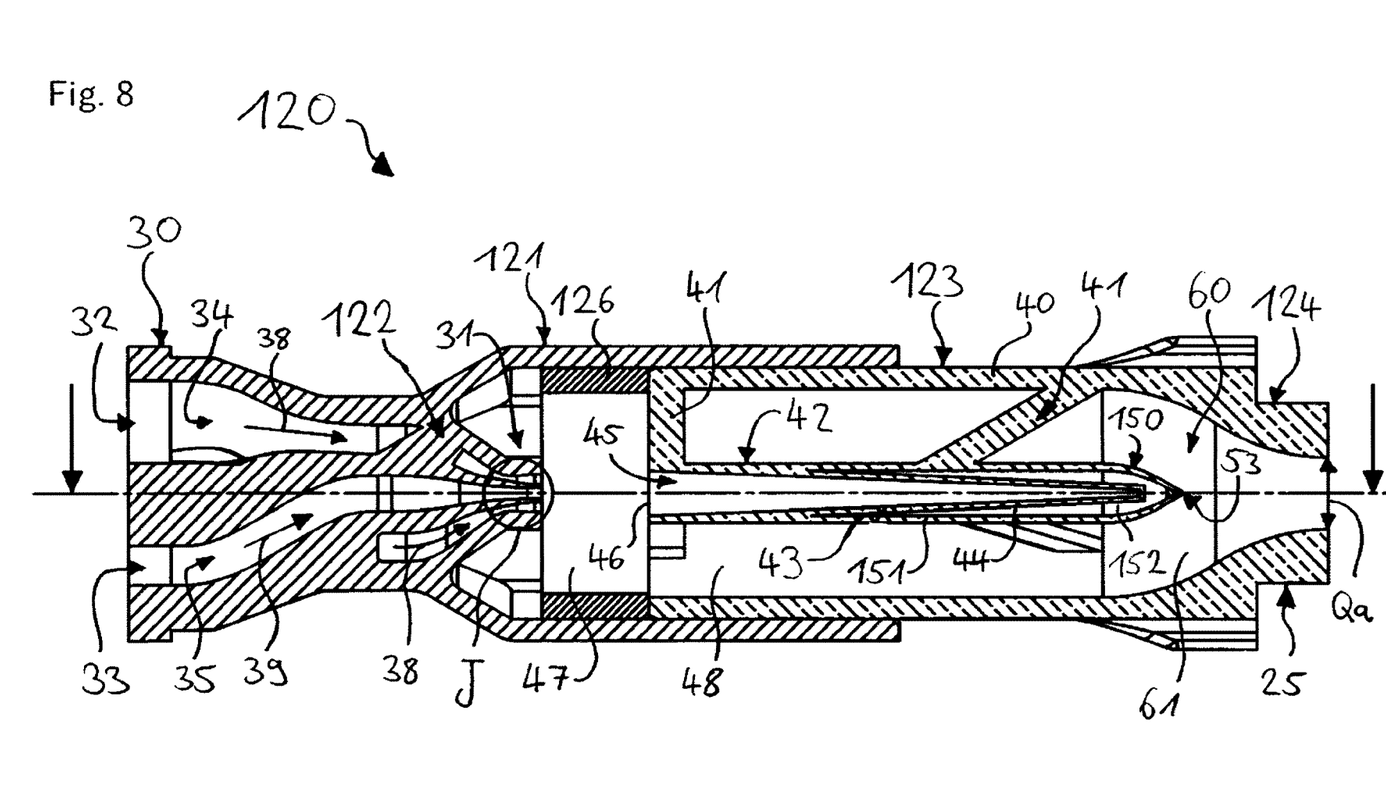
FIG. 8 depicts a cross-section along line VIII-VIII from FIG. 7.

The engine ignition device 120 is substantially rotationally symmetric and extends in an axial direction. The engine ignition device 120 comprises a housing 121 and a fluid flow injecting device 122. In contrast to the previous embodiment, in this embodiment the housing 121 and the fluid flow injecting device 122 are integrally formed as a single unitary matter. The engine ignition device 120 further includes an energy converting device 123 and an outlet device 124. The energy converting device 123 and the outlet device 124 are in contrast to the previous example, integrally formed as a single unitary member. Both components are inserted into each other and spaced apart by a fluid injecting side spacer 126.

Figure 9:
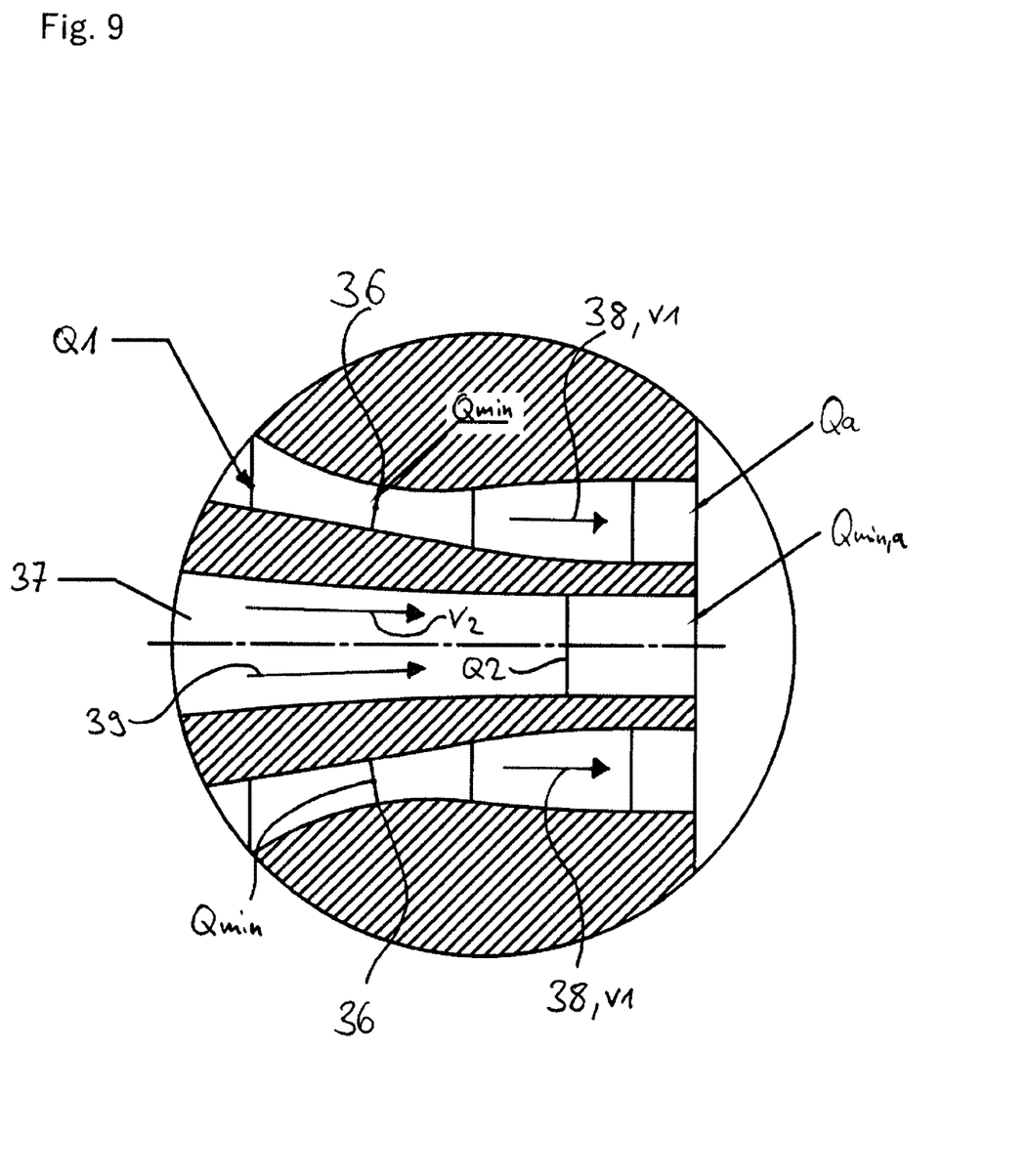
FIG. 9 depicts a detailed view of area J.

The energy converting device 123 may further comprise a heat transporting device 150. The heat transport reducing device 150 extends in circumferential direction over the whole length of the pressure oscillation generating device 42. The heat transport reducing device 150 comprises a heat transport reducing means 151, which is substantially cylindrically shaped having a streamlined form tapering towards a point. The heat transport reducing means 151 extends over the whole length of the pressure oscillation generating device 42 and surrounds it.

The heat transport reducing device 150 further comprises a heat transport suppressing portion 152, which is provided between the pressure oscillation generating device 42 and the heat transport reducing means 151. The heat transport suppressing portion 152 increases in volume along the direction of the fluid flow. During operation the heat generated at the pressure oscillation generating device 42 is confined by the heat transport reducing means 151 and may thereby concentrate said heat by means of reduced convection at the closed end of the pressure oscillating generating device 42 due to the heat transport suppressing portion 152.

The invention claimed is:

1. An ignition device for igniting a mixture, comprising
an energy converter configured for converting fluid flow energy of at least one fluid flow into heat, so as to ignite the mixture, the energy converting device having an ignition chamber for the at least one fluid flow, and
a fluid flow injector configured for injecting a plurality of fluid flows into the ignition chamber in such a manner that a first fluid flow is injected into the ignition chamber having a higher fluid flow velocity than a second fluid flow, the fluid flow injector comprising at least one injection nozzle for the first fluid flow, the injection nozzle having an injection nozzle cross-section which, viewed in a direction of flow, tapers down to a minimum cross-section and then expands again to an outlet cross-section,
wherein the fluid flow injector is configured such that the first fluid flow is injected having a first fluid flow velocity-which is supersonic.

2. The ignition device according to claim 1, wherein the fluid flow injector is configured such that the second fluid flow is injected having a second fluid flow velocity which is subsonic up to sonic.

3. The ignition device according to claim 2, wherein the fluid flow injector is configured such that the first fluid flow and the second fluid flow are coaxially injected relative to each other, wherein the first fluid flow at least partially surrounds the second fluid flow in the circumferential direction thereof.

4. The ignition device according to claim 2, wherein the energy converter comprises a pressure oscillation generator configured to generate pressure oscillations from the at least one fluid flow, wherein the pressure oscillation generator is arranged within the ignition chamber such that the pressure oscillation generator is impinged by the at least one fluid flow.

5. The ignition device according to claim 4, wherein the pressure oscillation generator includes a pressure oscillation generating cavity having a pressure oscillation opening, wherein the pressure oscillation opening is facing the fluid flow injector such that the pressure oscillation generating cavity is impinged by the at least one fluid flow, wherein the pressure oscillation generating cavity is configured to focus pressure oscillations towards an end distant from the pressure oscillation generating opening.

6. The ignition device according to claim 1, wherein the fluid flow injector is configured such that the first fluid flow and the second fluid flow are coaxially injected relative to each other, wherein the first fluid flow at least partially surrounds the second fluid flow in the circumferential direction thereof.

7. The ignition device according to claim 1, wherein the energy converter comprises a pressure oscillation generator configured to generate pressure oscillations from the at least one fluid flow, wherein the pressure oscillation generator is arranged within the ignition chamber such that the pressure oscillation generator is impinged by the at least one fluid flow.

8. The ignition device according to claim 7, wherein the pressure oscillation generator includes a pressure oscillation generating cavity having a pressure oscillation opening, wherein the pressure oscillation opening is facing the fluid flow injector such that the pressure oscillation generating cavity is impinged by the at least one fluid flow, wherein the pressure oscillation generating cavity is configured to focus pressure oscillations towards an end distant from the pressure oscillation generating opening.

9. The ignition device according to claim 1, wherein the energy converter comprises a heat transport reducer configured to reduce or prevent a transport of heat generated by the energy converter away from the energy converter.

10. An engine for an aircraft or a spacecraft, the engine comprising a combustion chamber and the ignition device according to claim 1, wherein the ignition device is connected to the combustion chamber in such a manner that a mixture present in the combustion chamber is able to be ignited by the ignition device.

11. An aircraft or spacecraft having the engine according to claim 10.

12. An igniting method for igniting a mixture within a combustion chamber of an engine by injecting a plurality of fluid flows into an ignition chamber which is provided with an energy converter, the energy converter being configured for converting fluid flow energy of at least one fluid flow into thermal energy, so as to ignite the mixture, wherein a first fluid flow is injected having a higher fluid flow velocity than a second fluid flow by at least one injection nozzle of a fluid flow injector, the injection nozzle having an injection nozzle cross-section which, viewed in a direction of flow, tapers down to a minimum cross-section and then expands again to an outlet cross-section,
wherein the fluid flow injector is configured such that the first fluid flow is injected having a first fluid flow velocity-which is supersonic.

13. An ignition device for igniting a mixture, comprising
an energy converter configured for converting fluid flow energy of at least one fluid flow into heat, so as to ignite the mixture, the energy converting device having an ignition chamber for the at least one fluid flow, and
a fluid flow injector configured for injecting a plurality of fluid flows into the ignition chamber in such a manner that a first fluid flow is injected into the ignition chamber having a higher fluid flow velocity than a second fluid flow, the fluid flow injector comprising at least one injection nozzle for the first fluid flow, the injection nozzle having an injection nozzle cross-section which, viewed in a direction of flow, tapers down to a minimum cross-section and then expands again to an outlet cross-section,
wherein the fluid flow injector is configured such that the second fluid flow is injected having a second fluid flow velocity which is subsonic up to sonic.

14. The ignition device according to claim 13, wherein the fluid flow injector is configured such that the first fluid flow and the second fluid flow are coaxially injected relative to each other, wherein the first fluid flow at least partially surrounds the second fluid flow in the circumferential direction thereof.

15. The ignition device according to claim 13, wherein the energy converter comprises a pressure oscillation generator configured to generate pressure oscillations from the at least one fluid flow, wherein the pressure oscillation generator is arranged within the ignition chamber such that the pressure oscillation generator is impinged by the at least one fluid flow.

16. The ignition device according to claim 15, wherein the pressure oscillation generator includes a pressure oscillation generating cavity having a pressure oscillation opening, wherein the pressure oscillation opening is facing the fluid flow injector such that the pressure oscillation generating cavity is impinged by the at least one fluid flow, wherein the pressure oscillation generating cavity is configured to focus pressure oscillations towards an end distant from the pressure oscillation generating opening.

* * * * *